(12) United States Patent
Sontakke et al.

(10) Patent No.: US 9,722,896 B2
(45) Date of Patent: Aug. 1, 2017

(54) MICRO-OAM FOR LINK GROUPS (71) Applicant: AVAGO TECHNOLOGIES GENERAL IP (SINGAPORE) PTE. LTD., Singapore (SG)

(72) Inventors: Ashish Ramkrishna Sontakke, Maharashtra (IN); Vivek Kumar, Bangalore (IN); Santhosh Kumar Chandrasekar, Bangalore (IN); Mohan Venkatachar Kalkunte, Saratoga, CA (US); Shahram Davari, Los Altos, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 46 days.

(21) Appl. No.: 14/747,768

(22) Filed: Jun. 23, 2015

(65) Prior Publication Data
US 2015/0381466 A1 Dec. 31, 2015

Related U.S. Application Data (60) Provisional application No. 62/016,879, filed on Jun. 25, 2014.

(51) Int. Cl.
*H04L 12/26* (2006.01)
*H04L 12/707* (2013.01)
*H04L 12/709* (2013.01)
*H04L 12/703* (2013.01)

(52) U.S. Cl.
CPC .......... *H04L 43/0811* (2013.01); *H04L 43/10* (2013.01); *H04L 45/245* (2013.01); *H04L 45/28* (2013.01)

(58) Field of Classification Search
CPC ... H04L 12/26; H04L 12/707; H04L 41/0803; H04L 41/0811; H04L 43/10; H04L 43/50; H04L 45/22; H04L 45/24; H04L 45/28; H04L 45/245; H04L 41/0816; H04L 43/0811; H04L 45/56; H04L 45/745; Y02B 60/33
See application file for complete search history.

(56) References Cited

U.S. PATENT DOCUMENTS 8,730,815 B2 * 5/2014 Sanguineti .......... H04L 41/0226
370/236.2
8,942,256 B1 * 1/2015 Barth ...................... H04L 45/02
370/255

(Continued)

OTHER PUBLICATIONS

IEEE Std 802.3ah, Sep. 7, 2004, pp. 1-623, IEEE Computer Society, New York, New York.

(Continued)

*Primary Examiner* — Tri H Phan
(74) *Attorney, Agent, or Firm* — Oblon, McClelland, Maier & Neustadt, L.L.P.

(57) ABSTRACT

Networks devices interconnected via link groups may implement micro operations administration and maintenance (micro-OAM) sessions. The micro-OAM sessions may be used to monitor the status of individual links within the link groups at small time scales. The micro-OAM session may be implemented on a non-internet protocol (non-IP) layer. In some cases, independent micro-OAM sessions may be used to monitor different links within a link group.

20 Claims, 5 Drawing Sheets

(56) References Cited

U.S. PATENT DOCUMENTS

| | | | |
|---|---|---|---|
| 2008/0089235 A1* | 4/2008 | Kotrla | H04L 41/0659 370/242 |
| 2008/0089236 A1* | 4/2008 | Kotrla | H04L 12/14 370/242 |
| 2009/0141622 A1* | 6/2009 | Bitar | H04L 41/0896 370/225 |
| 2009/0141731 A1* | 6/2009 | Bitar | H04L 12/5695 370/412 |
| 2011/0267941 A1* | 11/2011 | Bitar | H04L 41/0896 370/225 |
| 2012/0155283 A1 | 6/2012 | Sanguineti et al. | |
| 2014/0185461 A1* | 7/2014 | Gautreau | H04L 45/245 370/244 |
| 2014/0241147 A1* | 8/2014 | Rajagopalan | H04L 45/245 370/221 |
| 2014/0269255 A1* | 9/2014 | Zeng | H04W 24/04 370/219 |
| 2015/0071096 A1* | 3/2015 | Hayden | H04L 69/14 370/252 |
| 2015/0172112 A1* | 6/2015 | Itkin | H04L 45/245 370/216 |
| 2015/0281072 A1* | 10/2015 | Arumugam | H04L 45/245 370/392 |

OTHER PUBLICATIONS

Busi, I., et al., MPLS-TP OAM based on Y.1731, Jan. 11, 2012, pp. 1-29, MPLS Working Group, United States.

Shalunov, S., et al., A One-way Active Measurement Protocol (OWAMP), Sep. 2006, pp. 1-56, Network Working Group, The Internet Society, United States.

Morton, A., et al., Mixed Security Mode for the Two-Way Active Measurement Protocol (TWAMP), Aug. 2009, pp. 1-8, Network Working Group, United States.

Morton, A., et al., Individual Session Control Feature for the Two-Way Active Measurement Protocol (TWAMP), Aug. 2010, pp. 1-17, Internet Engineering Task Force, United States.

Frost, D., et al., Packet Loss and Delay Measurement for MPLS Networks, Sep. 2011, pp. 1-52, Internet Engineering Task Force (IETF), United States.

Bhatia, M., et al., Bidirectional Forwarding Detection (BFD) on Link Aggregation Group (LAG) Interfaces, Feb. 2014, pp. 1-11, Internet Engineering Task Force (IETF), United States.

\* cited by examiner

MICRO-OAM FOR LINK GROUPS

PRIORITY CLAIM

This application claims priority to provisional application Ser. No. 62/016,879, filed 25 Jun. 2014, which is entirely incorporated by reference.

TECHNICAL FIELD

This disclosure relates link status monitoring in computer networks.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in link monitoring, including improvements in link status monitoring, will further enhance performance of data networks.

DETAILED DESCRIPTION

In some networks, links between network nodes may be grouped together to form a link group, such as a link aggregation group (LAG). In some cases, operations, administration, and maintenance (OAM) systems may monitor the status of the link group. Additionally or alternatively, OAM systems may be used to update settings and other parameters of the links. In some implementations, a system may monitor the status of individual links with a link group. As system that monitors individual links may be referred to as a micro-OAM system. A system that monitors and controls the group itself may be referred to as a macro-OAM system. In some implementations, a micro-OAM. system may be applied to monitor the status of individual links within a link group, such as a LAG. For example, the micro-OAM may be able to identify whether individual links within a link group are up or down. Further, the time resolution of the status determinations may be as short as milliseconds or less. In various implementations, micro-OAM may be performed at a non-internet protocol (non-IP) layer. For example, in an open systems interconnection (OSI) model, the micro-OAM session may be implemented at a data-link layer or other OSI layer. In some cases, implementation of micro-OAM at a non-IP layer may allow for compatibility across IP and non-IP systems.

In an example case, a single (e.g., macro) OAM session may be setup to monitor and/or control a LAG. In the example, the OAM session may act as a bundled OAM session for the links in the LAG; e.g., the bundled OAM session need not necessarily have knowledge of the individual physical link members of the LAG.

In various micro-OAM systems, micro-OAM sessions are setup and run for individual member links of a link group. For example, one independent micro-OAM session per link may be implemented. In some cases, a macro-OAM session may be setup to control monitor and/or control a LAG in the aggregate, while concurrent micro-OAM sessions are setup for individual links within the same LAG.

Figure 1:
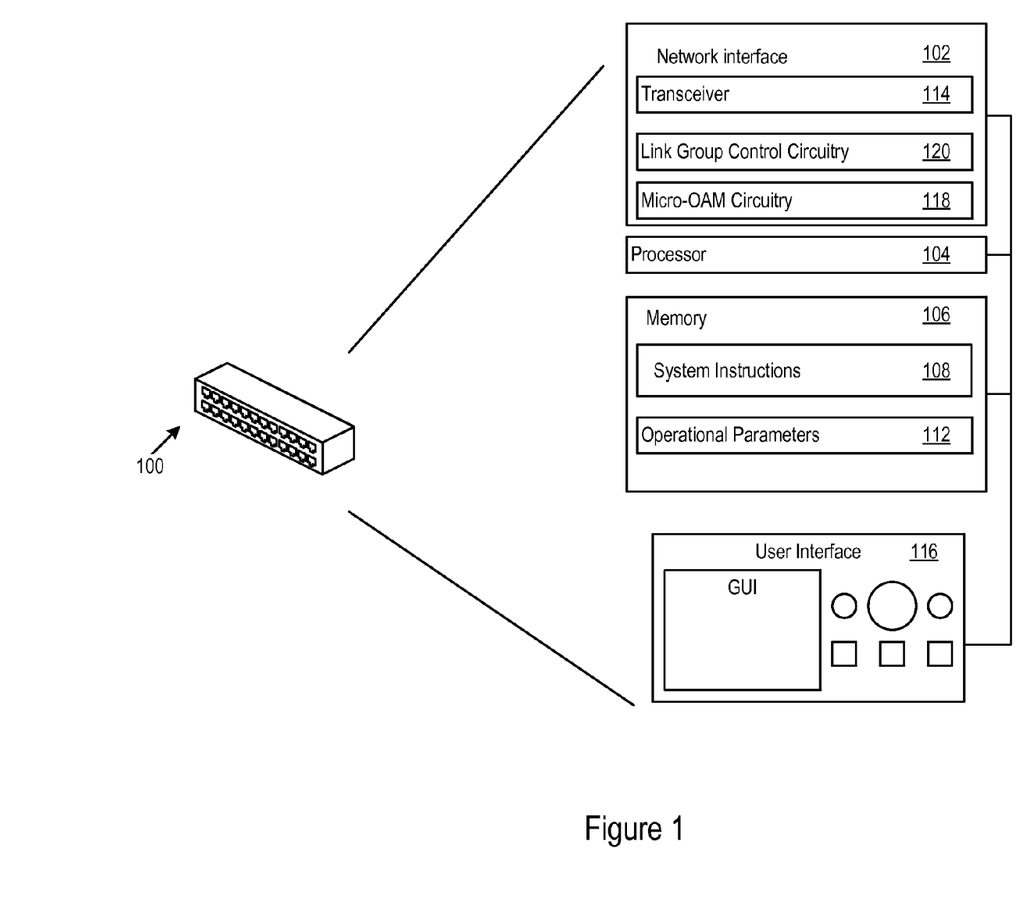
FIG. 1 shows an example device.

The example device described below provides an example context for explaining the techniques and architectures to support the micro-OAM techniques and architectures discussed below. FIG. 1 shows an example device 100. In one example, the device may be a communication device, such as a device in a communications network, an IEEE 802.3ah device, router, server, or virtually any device managing a link group. However, the device may be virtually any device implementing a network interface compatible with one or more protocols. For example, backbone networking hardware or other device implementing network functions physically or virtually may use the architectures described below.

The device 100 may include a network interface 102 to support network communications over one or more protocols, and one or more processors 104 to support execution of applications and operating systems, and to govern operation of the device. Further, the one or more processors 104 may run processes to determine the transmission protocol that is active on the interface 102. The device 100 may include memory 106 for execution support and storage of system instructions 108 and operational parameters 112. The communication device 100 may include a user interface 116 to allow for user operation of the device. A transceiver 114 within the network interface 102 may also be included to support transmission and/or reception of signals. The network interface 102 may further include micro-OAM circuitry 118 which may monitor link status within a link group. The network interface 102 may also include link group control circuitry 120 to control and establish link groups.

In some cases, two or more nodes or other devices may be connected via one or more link groups, such as LAGs. In some cases, it may be advantageous to monitor the members of the link group on time scales as short as milliseconds or less. Various implementations of the link aggregation control protocol (LACP) may be used to monitor the status of link group members. However, in some cases, the speed of LACP may allow for monitoring on the order of seconds and not necessarily on the order of milliseconds.

Link layer OAM, such as the implementation used in IEEE 802.3ah, is another system that allows for status determination, such as fault detection, of physical links. In some cases, to monitor the status of a link, a link layer OAM scheme may place a link in a loop-back mode. Placing a link in a loop-back mode may tie up the link and preempt data transmission.

Bidirectional forwarding detection (BFD) over LAG, used in RFC (Request for Comments) 7130, may be achieved by running IP-BFD over LAG. However, this approach uses IP connectivity, which implements nodes that are IP aware. In some cases, full IP functionality may not be present in some nodes, in the sense that the node does not implement at least some of the layers of the IP protocol stack. IP-BFD schemes may be incompatible with IP unaware nodes. For example, Multiprotocol label switching transport protocol (MPLS-TP) networks and many other non-IP networks may use nodes that are IP unaware.

In some implementations, a micro-OAM session may be implemented at a non-IP layer, for example a switching layer, Layer-2, or other non-IP layer. In some cases, implementations at a non-IP layer allow for compatibility across multiple IP environments, for example, IPv4, IPv6, or other IP schemes, because micro-OAM sessions do not necessarily use IP-specific infrastructure.

In various implementations, micro-OAM systems may use failure detection systems present in BFD, MPLS loss management and delay management (LMDM), two-way active management protocols (TWAMP), one-way active management protocols (OWAMP), Busi, Helvoort, Hee (BHH, a variant of MPLS), or other failure detection systems. For example, in some cases, the failure detection system used in micro-OAM may be implemented using architectures previously deployed on a network.

In some implementations, non-IP based applications may be implemented using EtherType based encapsulation, Generic Associated Channel Label (GAL) Associated Channel Header (ACH) based encapsulation, and/or other encapsulation types. In some cases, BFD, MPLS-LMDM, or other failure detection technologies may be used in place of Ethernet OAM.

EtherType Based Encapsulation

Figure 5:
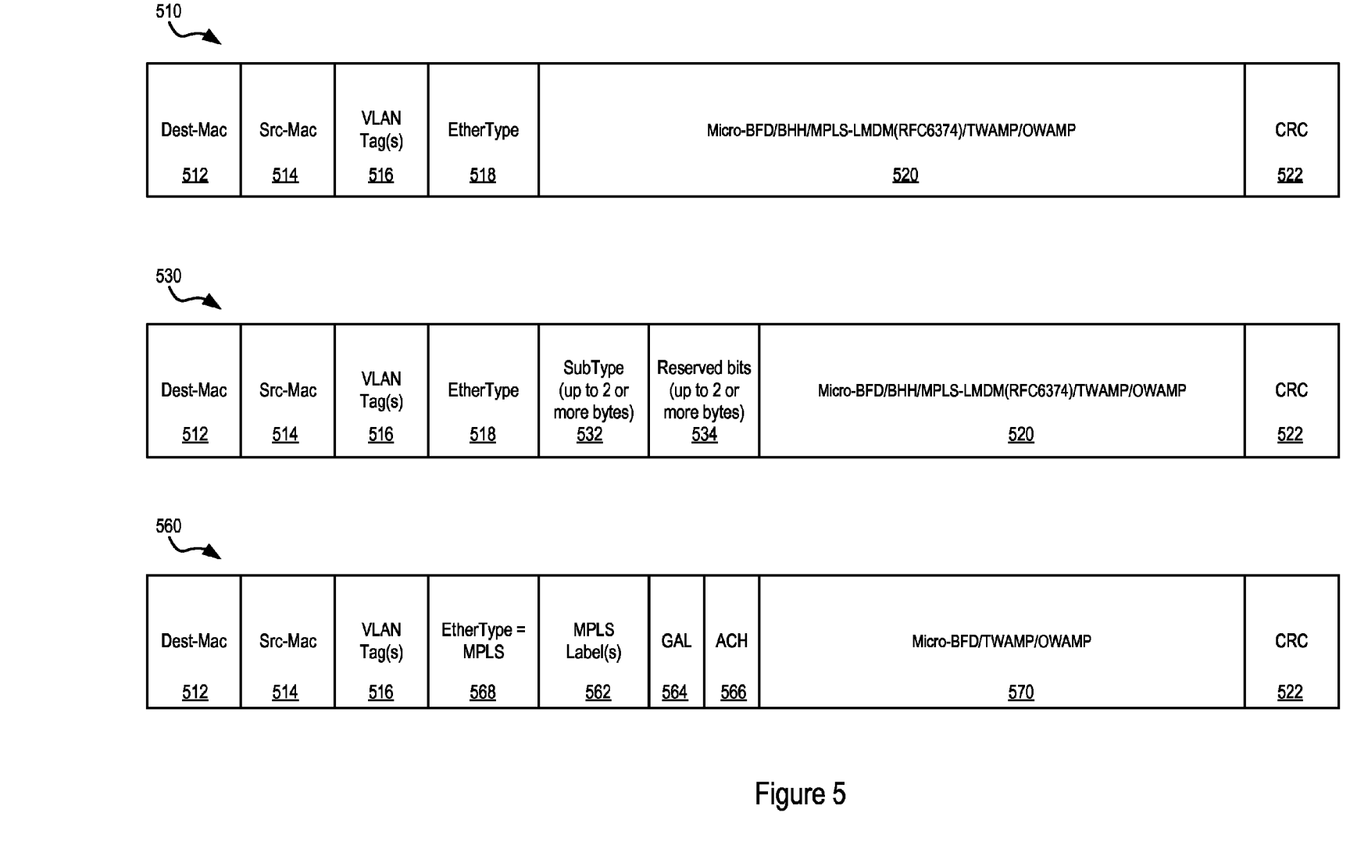
FIG. 5 shows three example Ethernet frames.

In an example system, a dedicated EtherType-based encapsulation system may be used for Micro-OAM in BFD, BHH, MPLS-LMDM (RFC6374), TWAMP, OWAMP, or other failure detection systems. Three example Ethernet frames 510, 530, and 560 are shown in FIG. 5.

In the example Ethernet frame 510, the Dest-MAC field 512 contains the destination media access control (MAC) address, the Src-MAC field 514 contains the source MAC address, the VLAN Tag field 516 includes tags to support virtual local area network (VLAN) options, the EtherType field 518 indicates the protocol used to encapsulate the payload of the Ethernet frame, the Micro-BFD/BHH/MPLS-LMDM (RFC6374)/TWAMP/OWAMP field 520 contains the micro-OAM payload implemented using a selected failure detection system, the CRC field 522 contains a cyclic redundancy check (CRC) for verification of the integrity of the transmitted frame.

In the example ethernet frame 530, a common EtherType indicator in the EtherType field 518 is used for the different failure detection systems, and a Subtype field 532 is added to the Ethernet frame to provide the indicator of the failure detection system type. In some implementations, the reserved bits field 534 may contain an indication of the maintenance domain level (MDL). The example ethernet frame is shown below. In some implementations, some fields, e.g., VLAN tags, MPLS labels, or other fields, may be optional.

GAL/ACH based Encapsulation

Referring again to FIG. 5, in an example Ethernet frame 560, GAL labeling system is used with a dedicated ACH type may be used for Micro-OAM over BFD, TWAMP, or OWAMP. In the example Ethernet frame 560, the Ether Type field 568 designates MPLS. The example Ethernet frame may further include a MPLS label field 562, and a GAL field 564. The Micro-BFD/TWAMP/OWAMP field 570 contains the micro-OAM payload implemented using a selected failure detection system. In the example Ethernet frame 560, the ACH type in the ACH field 566 indicates the failure detection system used. Additionally or alternatively, reserved bits in the ACH may be used to indicate the failure detection mechanism.

Field Values

In various implementations, such as those using the example Ethernet frames in FIG. 5, a link local MAC address may be used as the destination MAC address so that Micro-OAM packet may be consumed by switches without the switch forwarding the frame to another device.

Additionally or alternatively, a configurable MAC address may be used as the destination MAC address. The configurable MAC address may be programmed at the switch using a configuration register In various implementations, the source MAC address may include the address of the link monitored/controlled using the micro-OAM session sent over the Ethernet frame.

Figure 2:
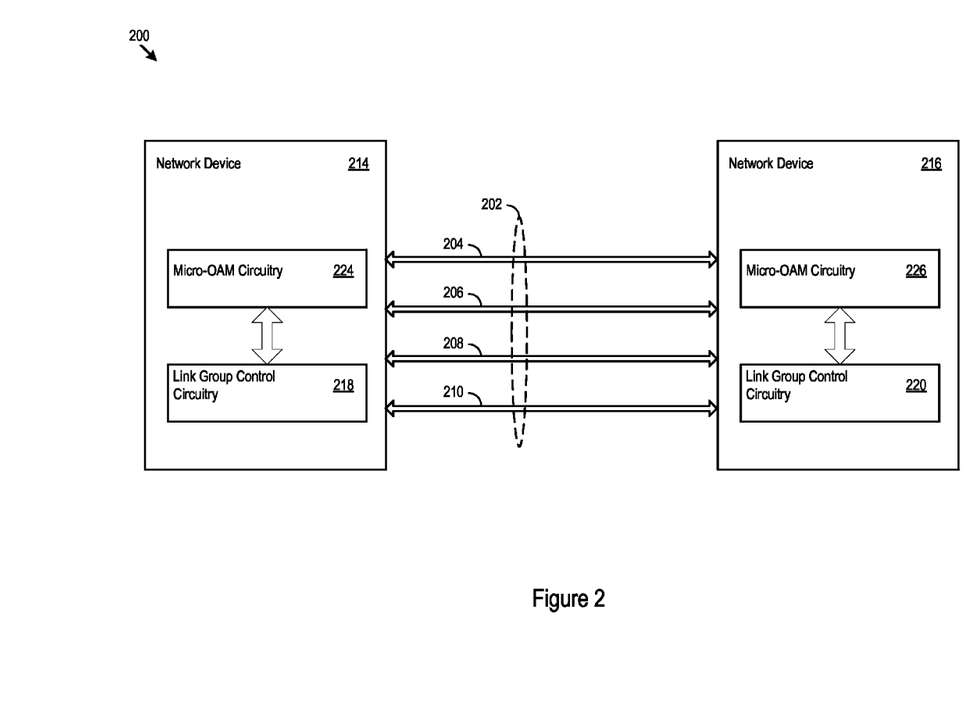
FIG. 2 shows an example link group environment.

FIG. 2 shows an example link group environment 200. A link group 202 may be formed, via control protocol or manual configuration, between two network devices 214, 216, such as switches or bridges. The link group 202 may be controlled via link group control circuitry 218, 220. For example, the LACP running on the link group control circuitry 218, 220 may be used to control the link group 202. In an example, the link group 202 may include a LAG.

Micro-OAM circuitry 224, 226 in in the network devices may maintain the micro-OAM session information for the individual links 204, 206, 208, 210 of the link group 202. The micro-OAM sessions may maintain individual datastreams, such as packet streams, to perform the micro-OAM link monitoring functions. The sessions may handle data transmission and reception. The data frames used to transmit micro-OAM session information may be transmitted using one or more packets, protocol data units (PDUs), or other transmission units used by the link group.

In various implementations, the micro-OAM data frames may include identifiers for the link group and individual link to which the frame is associated. For example, the your discriminator (YD) field in a BFD packet may include identifiers for the link group and individual link. In various implementations, micro-OAM frames for a particular session may be sent over the link monitored by the particular session. Alternatively, links may carry frames, in whole or in part, for micro-OAM sessions that are monitoring other links.

Figure 3:
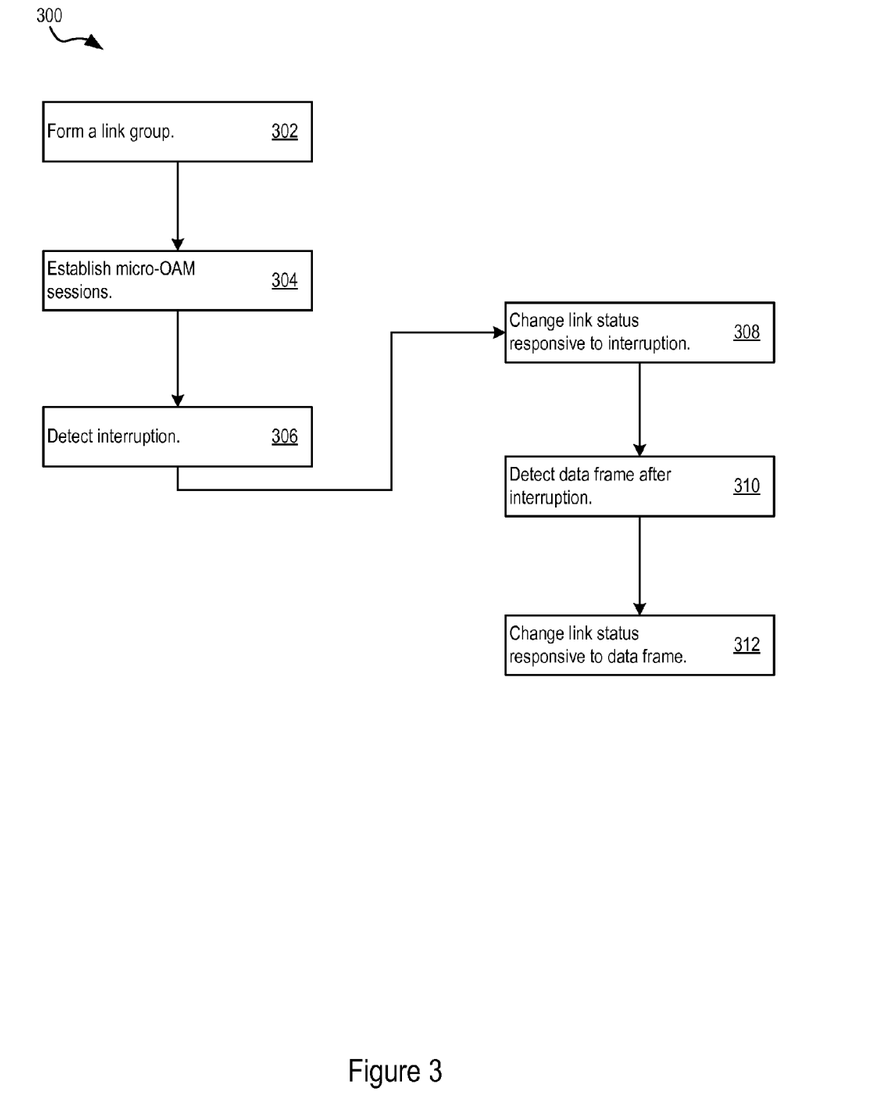
FIG. 3 shows example logic for link status monitoring.

FIG. 3 shows example logic 300 for link status monitoring. Network devices may form a link group (302). For example, a LAG may be formed between two bridges. Micro-OAM circuitry on the network devices may establish micro-OAM sessions to monitor the individual links within the link group. The Micro-OAM circuitry on the devices may exchange OAM data frames (304). When a link fails or is otherwise impeded, OAM data frames for the micro-OAM session for a link may be interrupted. The logic 300 may detect an interruption from an impeded link (306). For example, the logic 300 may include a timing threshold for receiving micro-OAM frames. If the timing threshold is exceeded, for example the period between successive OAM data frames is longer than a determined period, the logic 300 may determine an interruption to have occurred. The logic 300 may change the link status responsive to the interruption (308). For example, the logic may change the link status to "DOWN". Additionally or alternatively, the logic 300 may inform a link group control circuitry of the interruption and/or change in status. In various implementations, the link group control circuitry may make status determinations for the individual links based on updates sent from the logic 300. The logic 300 may detect a micro-OAM data frame after detecting the interruption (310). Detection of micro-OAM data frame after an interruption may indicate that the link has come back up. The logic 300 may change the link status responsive to the detection (312).

In some implementations, forwarding logic or LAG resolution/hashing need not be applied to transmitted micro-OAM data frames. The micro-OAM data frames may be transmitted directly over the individual link member selected by micro-OAM circuitry. In some cases, received micro-OAM data frames may be referred based on the port over which they are received.

Figure 4:
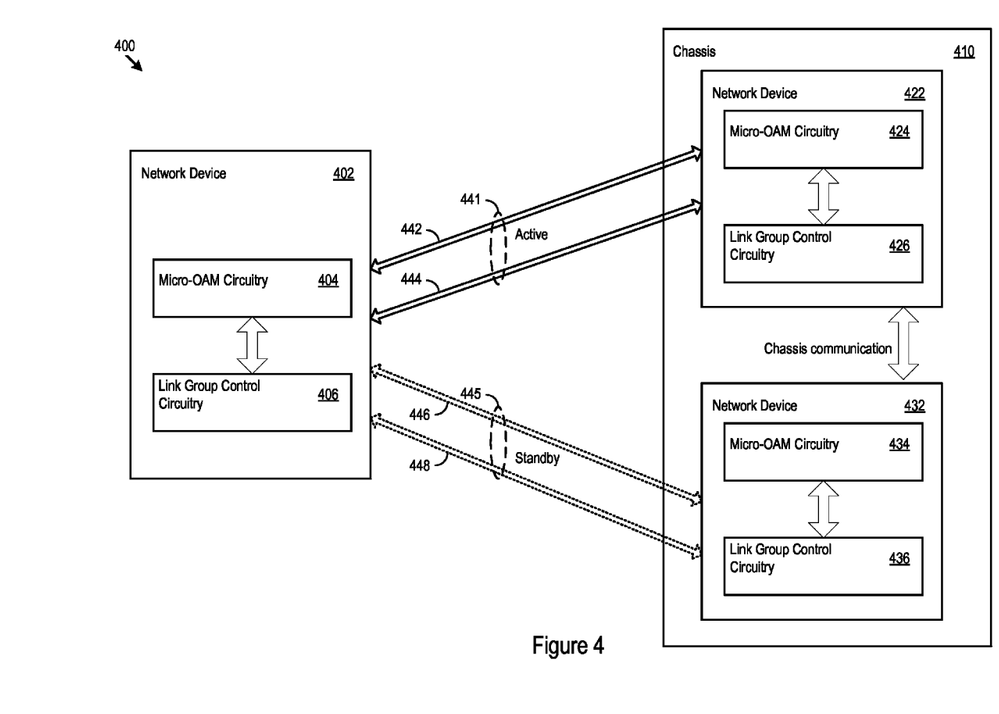
FIG. 4 shows an example multi-chassis link group environment.

FIG. 4 shows an example multi-chassis link group environment 400. In the multi-chassis link group environment 400, a network device 402, such as a switch, may include micro-OAM circuitry 404 and link group control circuitry 406. A chassis 410 may include multiple network devices 422, 432. In some cases, multiple network devices may provide the chassis 410 with link redundancy. The network devices 422, 432 may include micro-OAM circuitry 424, 434 and link group control circuitry 426, 436. The link group control circuitry 426, 436 for the network devices 422, 432 within the chassis may establish links 442, 444, 446, 448 with the link group control circuitry 406 of the network device 402 outside the chassis. Where links 442, 444 are members of link group 441 and link group 445 has members 446 and 448. The links may be monitored using the micro-OAM circuitry 404, 424, 434 within the network devices 402, 422, 432. In some implementations, the link group 445 may provide redundancy, for example, fail-over redundancy, node-level redundancy or other redundancy, for the link group 441. For example, the example environment 400 may implement redundancy in a multi-chassis LAG scheme and link groups 441, 445 may be combined into a single LAG. In the example environment 400, link group 441 is shown in an active mode and link group 445 is shown in a standby mode. Other mode configurations are possible.

Configuration Registers

Identifying Micro-OAM data frames may done using the data frame fields: EtherType, SubType, ACH, and/or other fields. Additionally or alternatively, values within the configuration registers on the network device may be used to identify micro-OAM data frames. For example, a network device, such as a switch or bridge, may include configuration registers which may be used to specify which EtherType value indicates that a received data frame is a Micro-OAM frame. Additionally, the same configuration register may be used to determine the value to place in the EtherType field of a micro-OAM data frame. In various implementations, configuration registers for Subtype, ACH, Dest-MAC, and/ or other data frame fields may be included on the network device.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device comprising:
   circuitry configured to
   establish multiple links to a network node;
   aggregate the multiple links into a link group;
   set up a management session for an individual link of the multiple links in the link group;
   receive, from the network node, a status indication at a non-internet protocol (non-IP) layer of a communication protocol stack running on the device for the individual link based on the management session.

2. The device of claim 1, wherein the network node lacks a functionality provided by an IP layer of the communication protocol stack.

3. The device of claim 1, wherein the circuitry is configured to receive the status indication at a switching layer of the communication protocol stack.

4. The device of claim 1, wherein the circuitry is configured to encapsulate a management message in a frame of the non-IP layer of the communication protocol stack.

5. The device of claim 4, wherein the circuitry is configured to instruct the network node to forgo forwarding of the management message by addressing the management message to the network node using a link local address.

6. The device of claim 4, wherein the management message comprises an update for a setting for the individual link at the network node.

7. The device of claim 1, wherein the status indication comprises a management message from the network node.

8. The device of claim 7, wherein the management message includes an indication of a failure detection system implemented at the network node.

9. The device of claim 7, wherein
   the management message includes identifiers for the individual link, and
   the circuitry is configured to receive the management message over another link of the multiple links.

10. The device of claim 7, wherein the circuitry is configured to:

receive the management message over the individual link; and assign the management message to the individual link responsive to receiving the management message over the individual link.

11. The device of claim 1, wherein the circuitry is configured to receive the status indication by detecting an interruption in a packet stream for the management session.

12. The device of claim 1, further comprising:
a register configured to store an indication of an encapsulation scheme for the management session, wherein the circuitry is configured to
access the register to determine the encapsulation scheme for the management session for the individual link;
encapsulate, in accordance with the encapsulation scheme, an outgoing management message for the management session within a payload of a frame at the non-IP layer; and
extract, in accordance with the encapsulation scheme, the status indication for the individual link from an incoming management message.

13. The device of claim 12, wherein the circuitry is configured to instruct the network node to forgo forwarding of the management message by addressing the management message to the network node using a link local address.

14. A device comprising:
circuitry configured to
establish multiple links to a network node;
aggregate the multiple links into a link group;
set up a management session for an individual link of the multiple links in the link group;
receive, from the network node, a status indication for the individual link based on the management session; and
activate a redundancy link responsive to the status indication.

15. The device of claim 14, wherein the circuitry is configured to receive the status indication at a non-internet protocol (non-IP) layer of a communication protocol stack running on the device.

16. A device comprising:
circuitry configured to
establish multiple links to a network node;
aggregate the multiple links into a link group;
set up a management session for an individual link of the multiple links in the link group;
receive, from the network node, a status indication for the individual link based on the management session; and
a register configured to store an indication of an encapsulation scheme for the management session, wherein the circuitry is configured to access the register to determine the encapsulation scheme to extract the status indication.

17. The device of claim 16, wherein the circuitry is configured to receive the status indication at a non-internet protocol (non-IP) layer of a communication protocol stack running on the device.

18. A method comprising:
establishing multiple links to a network node;
aggregating the multiple links into a link group;
initializing a management session for an individual link of the multiple links in the link group; and
receiving a status indication at a non-internet protocol (non-IP) layer of a communication protocol stack for the individual link based on the management session.

19. The method of claim 18, further comprising:
accessing a register to determine an encapsulation scheme of the status indication.

20. The method of claim 18, wherein
receiving the status indication comprises receiving a management message over the individual link, and
the method further comprises assigning the management message to the individual link responsive to receiving the management message over the individual link.

* * * * *